United States Patent [19]

Zion

[11] 4,023,464
[45] May 17, 1977

[54] AUTOMATIC MULTI-BLANK KEY CUTTING DEVICE

[75] Inventor: Alfred B. Zion, Montreal, Canada

[73] Assignee: Dominion Lock Company Ltd., Montreal, Canada

[22] Filed: June 23, 1976

[21] Appl. No.: 698,828

[52] U.S. Cl. .............................................. 90/13.05
[51] Int. Cl.² ........................................ B23C 3/35
[58] Field of Search .................... 90/13.05; 83/917

[56] References Cited

UNITED STATES PATENTS

| | | | |
|---|---|---|---|
| 2,805,792 | 9/1957 | Schachinger | 90/13.05 X |
| 3,011,411 | 12/1961 | Raymond | 90/13.05 |
| 3,469,498 | 9/1969 | Adler et al. | 90/13.05 |

Primary Examiner—J. M. Meister
Attorney, Agent, or Firm—Mark T. Basseches; Paula T. Basseches

[57] ABSTRACT

The present invention is directed to an improved key cutter, and more particularly to a key cutting devie adapted simultaneously to cut two key blanks in accordance with the bitting of a pattern key. The apparatus is characterized by the inclusion of a vise assembly for carrying the pattern key and the key blanks which simultaneously engages the surfaces of the key blanks on spaced portions of the periphery of a single milling or cutting wheel, the apparatus including, in addition, means for compensating for wear and dulling of the cutter wheel.

8 Claims, 5 Drawing Figures

AUTOMATIC MULTI-BLANK KEY CUTTING DEVICE

BACKGROUND

1. Field of the Invention

The present invention is in the field of key cutting devices, and more particularly in the field of cutting devices of the type wherein a pattern key to be duplicated serves as a guide for a stylus assembly which controls the relative movement of a key blank to be cut and a cutting or milling wheel in such manner that the desired pattern is cut in the blank.

2. The Prior Art

As is well known, a conventional means of forming a replacement key involves clamping an existing key and a key blank on a carriage in a predetermined spaced relationship. A rotary cutter and stylus are mounted on a frame, the spacing between the cutter and stylus corresponding to the spacing between the cut key and the key blank. By manually or automatically scanning the bitted surface of the cut key across the stylus (either by holding the stylus and cutter in fixed position and moving the carriage or vice versa), the key blank is caused to move through a similar pattern relative to the periphery of the rotary cutter, whereby a pattern corresponding to the pattern of the original key is formed on the surface of the blank.

It will be readily recognized that since the bitted portion of the cut key is used to lift the disks or tumblers of a lock, the newly cut key must conform with great accuracy to the dimensions of the pattern or original key. Differences in cut depth measuring in the thousandths of an inch may be sufficient to render the duplicate key inoperative.

It is of course desirable that duplicate keys be made as rapidly as possible since in locksmithing establishments the customer must often wait while the cutting is being effected. As a means for expediting the cutting, especially where multiple duplicate keys having the same bitted pattern are desired, certain key cutting machines have been developed which are capable of simultaneously cutting two blanks. Such devices have heretofore comprised a vise assembly having a first clamp for the pattern key and having a longitudinally spaced pair of clamps to support the key blanks. The motor shaft or a shaft driven thereby is typically provided with a pair of milling wheels displaced axially along the shaft at spaced positions corresponding to the spacing of the clamps supporting the key blanks. The blanks are cut to the pattern of the original key which, as hereinabove noted, is scanned across the surface of a stylus and carries with it the key blanks which are concomitantly moved across the spaced cutters.

Although devices of the type described have been successfully utilized to expedite the production of cut keys by enabling two such keys to be formed in the course of a single tracing operation, certain drawbacks inhere in multi-blank cutters heretofore known which have greatly impeded their widespread and successful use. Specifically, it is not uncommon for the blanks which are simultaneously processed to be cut to differing depths, whereby one or both of the keys may prove inoperative.

I have determined that a principal cause of such inaccuracy in machines of the type described resides in the fact that such machines are often employed to cut only one blank. As a result, over a period of time a condition may develop wherein one of the two cutting wheels will have received substantially greater use than the other, with the result that the overall diameter of the more frequently used wheel will be less than that of the less frequently used wheel. When such condition exists, the blank cut by the less used milling wheel will be cut to a greater depth than the other blank.

While it is feasible to compensate for wear, readjustment of the alignment of the stylus and cutters is a time consuming task and the normal tendency in locksmithing establishment is to put off the alignment operation. Often it is not until customers have complained of improperly cut keys that the inaccuracy is noticed and readjustment effected.

SUMMARY

The present invention may be summarized as directed to an improved key cutting device capable of simultaneously and accurately cutting two blanks at once. The device is characterized by the two blanks to be cut being scanned against spaced portions of the periphery of the same cutting wheel whereby it is assured that both duplicate keys will be identical. Moreover, the operation of compensating for wear in the cutter wheel is greatly facilitated.

The apparatus includes a variable pressure spring plunger assembly modifying the force with which the key blanks are pressed against the cutting surface, whereby it may be assured that the cuts are effected to the full depth, notwithstanding some dulling of the cutter.

Accordingly, it is an object of the invention to provide an improved key cutting device adapted accurately to fabricate two duplicate keys in a single automatic cutting cycle.

A further object of the invention is the provision of a device of the type described wherein both of the key blanks are scanned across the surface of a single cutting wheel or miller.

Still a further object of the invention is the provision of a cutting device of the type described wherein the pressure with which the key blank or blanks are pressed against the cutting wheel may be varied as desired, so as to permit compensation for reduction in the sharpness of the miller, whereby cutting to the full depth is assured in a single operative cycle of the machine, in contrast to machines heretofore known wherein proper cutting is attained only after the cutting cycle is repeated.

To attain these objects and such further objects as may appear herein or be hereinafter pointed out, reference is made to the accompanying drawings, forming a part hereof, in which.

Figure 1:
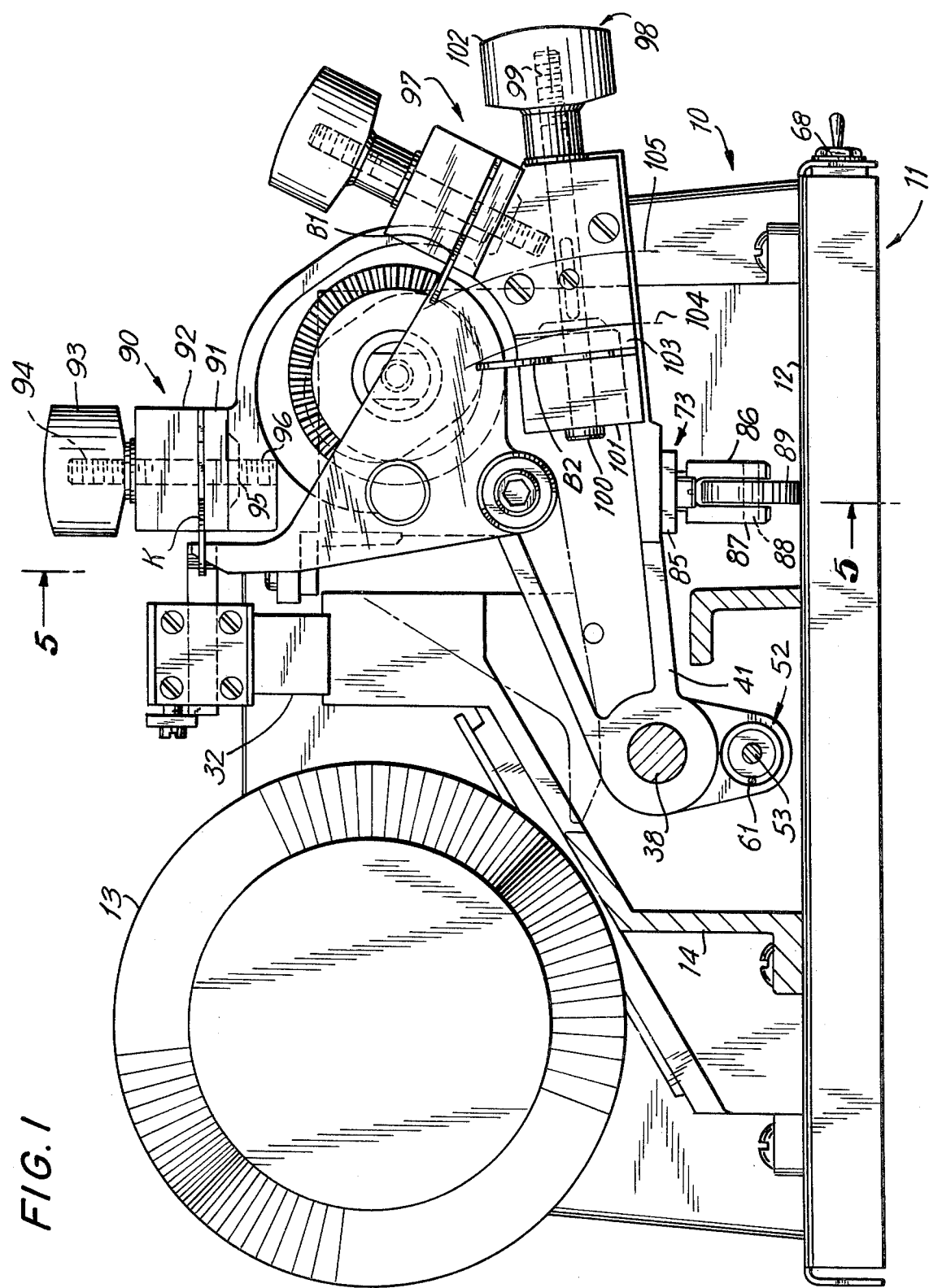
FIG. 1 is a side elevational view of a key cutting machine in accordance with the invention.

Referring now to the drawings, there is disclosed a key cutter in accordance with an embodiment of the invention. As many of the details of the cutter are, by and large, common to automatic key cutters in general, the ensuing description will refer to such common elements only briefly, with particular emphasis being focused on the innovative aspects thereof.

In accordance with the invention, the cutter 10 includes a frame 11 having a generally flat base plate 12. A motor 13 provides power for the operation of the device. The motor 13 may be supported on a mounting bracket or brackets 14.

The motor includes an output drive pulley 15 linked by drive belt 16 to pulley 17 made fast to the main drive shaft 18. The drive shaft 18 is journalled in bearings 19, 20 fixed to the frame 11.

A circular cutting or milling wheel 21 is fixed to the shaft 18 for rotation therewith. It will be understood that the milling wheel 21, during operation of the device, is rotated and forms the bits or cuts in the key blanks B1, B2 supported on a vise assembly 22.

The vise assembly, in the course of operation, is cyclically scanned axially back and forth in a direction parallel to the shaft 18, whereby the blanks B1 and B2 are caused to move across the cutting wheel 21. Axial motion of the vise assembly and automatic operation of the machine are controlled by a drive cam 23.

The drive cam 23 is fixed to a shaft 24 journalled in the frame. It will be understood that a single revolution of the cam 23 occurs during each cutting cycle of the machine.

Motive power for rotation of the cam is derived via a step down gearing arrangement which includes a worm 25 fixed to the shaft 18 and a worm wheel 26 fixed to cross shaft 27. A second worm 28 on the shaft 27 engages a second worm wheel 29 bolted to the boss 30 forming a part of the casting which includes the drive cam 23. Drive cam 23 includes a cam face 31 including an inclination in the direction of the longitudinal axis of the shaft 24. A stylus mounting bracket 32 is fixed to the frame 11, as by machine screws 33. A stylus 34 having a chisel shaped follower tooth 35 is mounted in the bracket 32.

A lock adjustment assembly 36 controls, e.g. enables the setting of, the extent to which the tooth 35 of the stylus extends beyond the bracket. The spacing or separation of the tooth portion 35 of the stylus and periphery or cutting edge 21 of the milling member is thus fixed, such spacing being variable by adjustment of the assembly 36.

Figure 2:
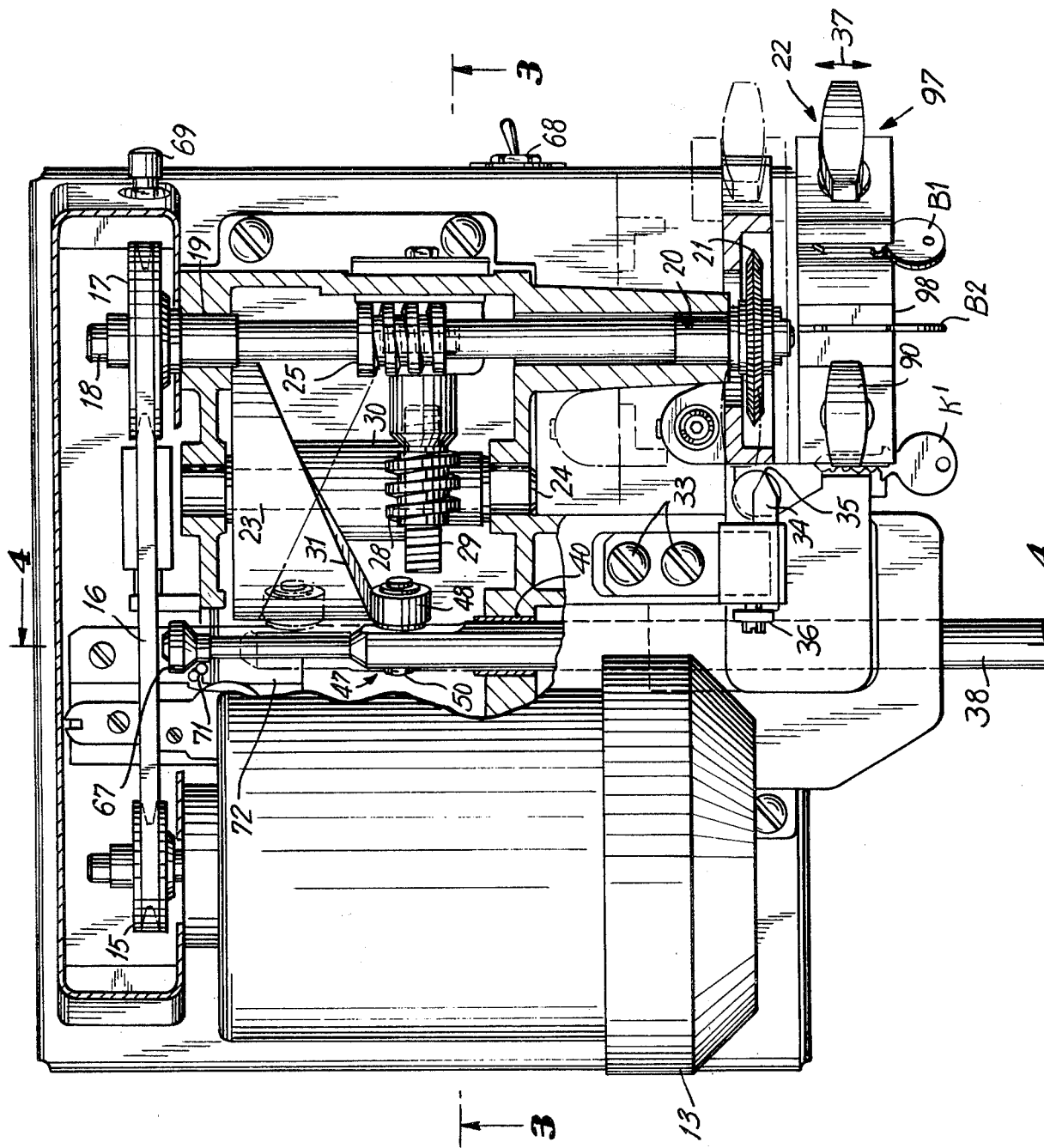
FIG. 2 is a plan view of the machine of FIG. 1.
Figure 3:
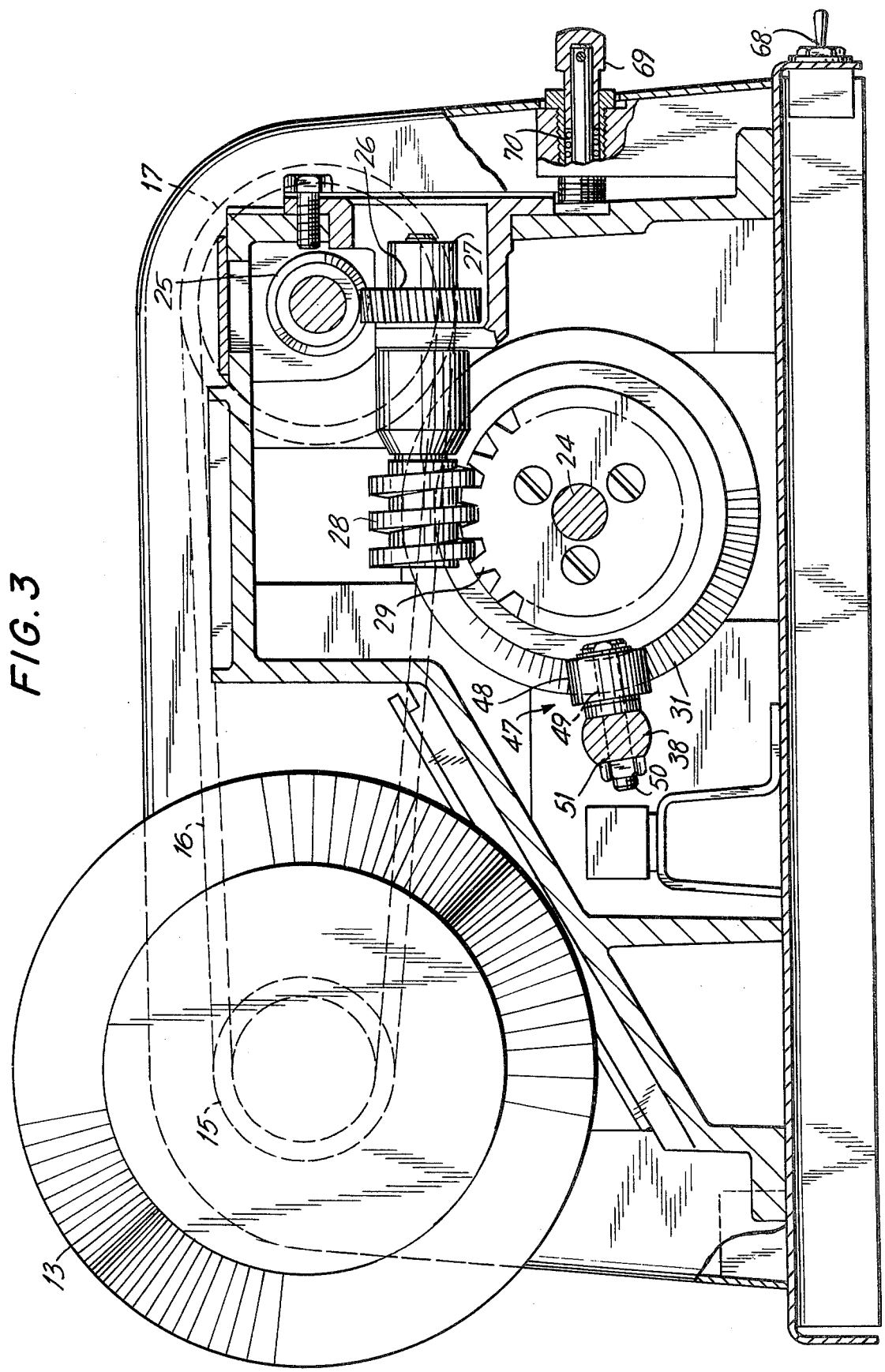
FIG. 3 is a sectional view taken on the line 3—3 of FIG. 2.

The vise assembly 22 is movably mounted on the frame 10, the assembly being reciprocably shiftable in the direction of the arrow 37, FIG. 2, the vise assembly being likewise pivotal in the direction of the axis of the vise assembly mounting shaft 38. The shaft 38 is slidably and pivotally journalled within spaced bearings 39, 40 fixed to the frame 11.

The vise assembly 22 includes a lever arm 41 terminating in an inner boss 42 having a central bore 43. The shaft 38 passes through the bore 43 and is fixed to the boss by transverse locking pin 44 passing through aligned apertures 45 in the boss and transverse aperture 46 in the shaft 38.

From the above description it will be observed that the vise assembly 22 may move longitudinally, e.g. in the direction of the arrow 37, by the sliding movement of the shaft 38 in the bearings 39, 40, and that the vise 22 is likewise free to pivot about the axis of the shaft 38 by virtue of the rotatability of the shaft within the main bearings 39, 40.

The shaft 38 carries a follower assembly 47 at a medial position therealong, the follower assembly 47 including a follower wheel 48 rotatably mounted on bearing 49 fixed to cross bolt 50 extending through a flattened segment 51 of the shaft 38. The follower or roller 48 is juxtaposed to and bears against the inclined cam surface 31 of the drive cam 23. In order to maintain the follower or roller 48 against the cam surface 31 and to achieve a return stroke of the vise assembly, there is provided an adjustable spring biasing assembly 52. The biasing assembly 52 includes a mounting rod 53 threadedly connected at 54 to flange 55 forming part of the frame 11. A lock nut 56 is mounted over the outwardly extending end portion 57 of the control rod, which outwardly extending portion includes a transverse slot 58 for reception of a screw driver, enabling the rod and the outer spring seat 59 carried thereby to be adjusted inwardly or outwardly relative to the frame and to be locked in position, as by tightening of the nut 56. The seat 59 mounts the outer end 60 of a compression spring 61, the inner end 62 of which spring is received by an inner spring seat 63.

The spring seat 63 bears against an ear portion 64 depending from the mounting boss 42 of the vise assembly 22. An oversized arcuate aperture 65 is formed in the ear, the aperture 65 providing clearance to permit pivotal movement of the boss relative to the frame without interference by the inner end of the control rod 53.

Figure 4:
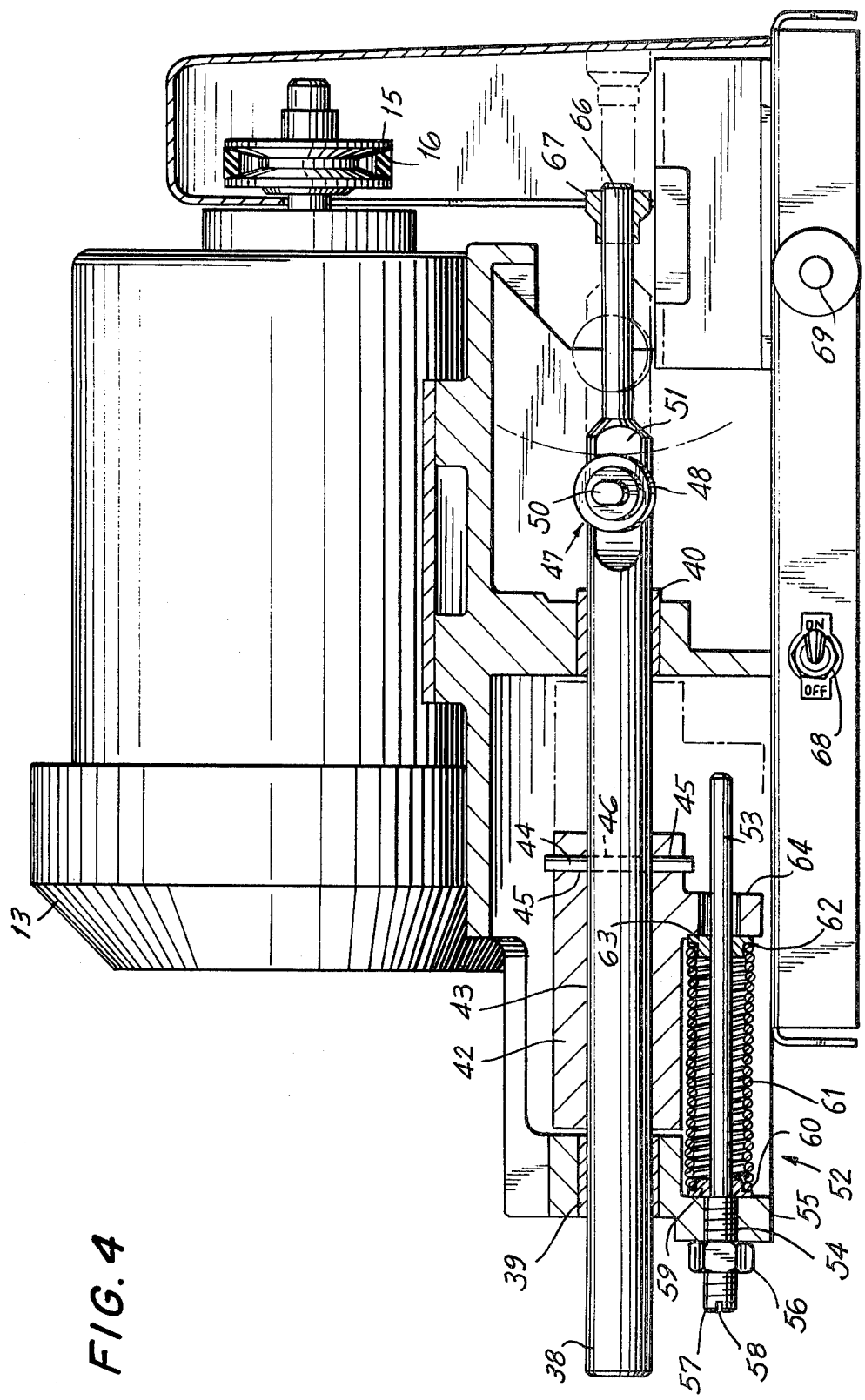
FIG. 4 is a section taken on the line 4—4 of FIG. 2.

It will be appreciated that the compression spring 61 tends to urge the entire vise assembly 22 to the right as viewed in FIG. 4, whereby the follower or roller 48 is constantly maintained in contact with the cam surface 31, as previously described.

In the course of a complete rotation of the cam 23, the vise assembly moves from a lefthandmost initial position shown to a righthandmost limiting position (shown in dot and dash, FIG. 4) and back to the solid line or starting position depicted.

The vise assembly mounting shaft 38 carries, adjacent its inner end 66, a switch actuator cam 67. The switch actuator cam 67, as will be set forth hereinafter, acts in the manner of a limiting switch trip automatically to deactivate the motor circuit after the vise assembly has been shifted through an operative cycle.

The motor is controlled by a main power switch 68 and by a start switch plunger 69. The plunger 69 is normally outwardly biased by actuator spring 70. When the plunger is shifted inwardly, the trip member 71 of micro switch assembly 72 is closed, initiating current flow in the motor. The micro switch remains closed until trip member 71 is again engaged by the actuator cam 67, such engagement occurring after the actuator cam 67 returns to the lefthand-most or solid line position shown in FIG. 2.

Additional details of the switch and latching arrangement for the plunger have not been shown since the same are, in all respects, conventional and it will be appreciated that any micro switching arrangement responsive to return of the vise carriage assembly 22 after completion of a cycle or to the completion of a single rotation of cam 23 may be satisfactorily substituted for the above described arrangement.

Figure 5:
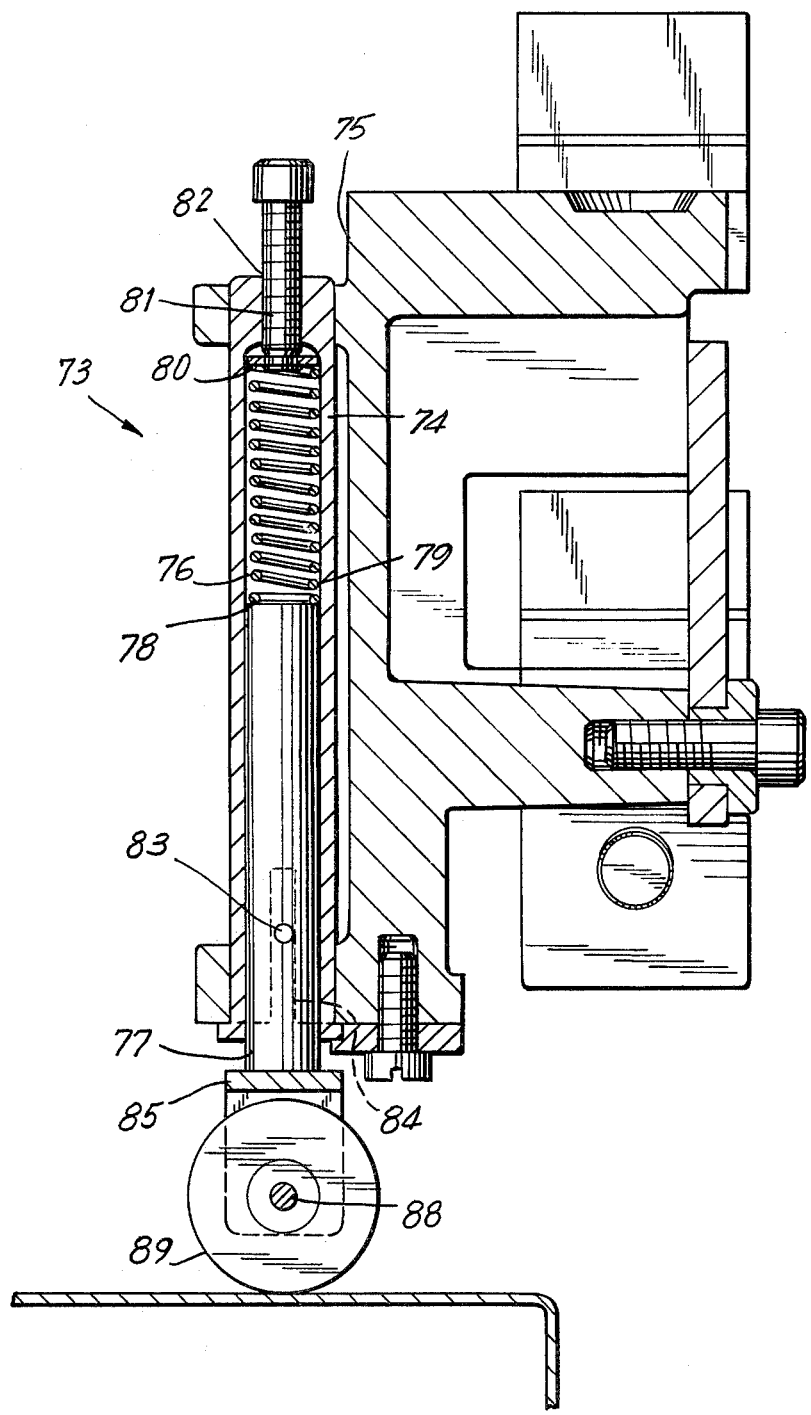
FIG. 5 is a section taken on the line 5—5 of FIG. 1.

The vise assembly 22 is yieldingly biased in an anticlockwise direction when viewed in the orientation of FIG. 1 about the shaft 38 by a variable pressure spring feed assembly 73, shown in FIGS. 1 and 5. The assembly includes a tubular guide 74 fixed to a casting 75 forming part of the vise assembly 22. A compression spring 76 is mounted within the guide 74. A rod 77 is slidably mounted within guide 74, the upper end 78 of the rod bearing against the lower end 79 of the spring 76.

The upper end of the spring 76 bears against a movable seat 80 fixed to the lower end of an adjustment bolt 81 threaded at 82 to receive the complementally threaded bolt 81. It will be understood that by shifting the bolt 81 downwardly and upwardly, the spring tension and, hence, the upward biasing force with which the vise assembly is urged against the cutter and stylus may be adjusted.

The rod 77 is prevented from rotating within the guide 74 by a cross pin 83 seated within opposed vertical slots 84 in the guide 74. The lower end of the rod 77 carries a bifurcated bracket 85 having depending flanges 86, 87 provided with aligned apertures which carry a cross pin 88. A roller member 89 is rotatably mounted on the cross pin 88. The roller member 89 bears against a flat portion of the base 12 and the reactive force of the spring, acting through the engagement of the roller 89 and base, tends to pivot the vise upwardly. It will be appreciated that the upward force exerted by the spring 76 provides a cutter feed means which yieldably urges the pattern key against the tracer tooth 35 and the key blanks B1 and B2 to be cut against the periphery of the cutting or milling wheel 21.

The vise assembly 22 includes a first vise member 90 for holding the cut key K sought to be reproduced. The vise 90 includes a fixed lower block 91 and a movable upper jaw 92. A thumb screw 93 carries a threaded shank member 94 passing through an aperture in movable jaw 92. The lower end 95 of the shank 94 is disposed in a complementally threaded aperture 96 in the vise assembly casing.

The key vise 90 may include an internal stop shoulder (not shown) which functions to engage against the locating shoulder formed at the junction of the key bow and shank of keys and key blanks. The locating shoulder functions as the depthwise reference both in the cutting of the key and in the insertion of the key into a lock mechanism for operation thereof. Since the vise 90 is per se in all respects conventional and since various types of vises heretofore known may be suitably substituted, additional discussion of the details thereof is omitted. It may be noted, however, that the vise 90 may be of the type wherein four sets of clamping surfaces are provided by rotating the vise about the axis of the bolt 94 until a proper pair of surfaces is directed toward the stylus. Such arrangement, which is known per se, enables the cutting of keys having various depths of shanks and other dimensional distinctions.

The vise 97 for the key blank B1 is essentially identical to the vise assembly 90.

The vise assembly 98 supporting the blank B2 is functionally identical, except that in this vise assembly the shank 99 is longer and is provided with a stop head member 100 disposed beneath the movable jaw 101, rotation of the thumb screw 102 functioning to shift the movable jaw 101 toward fixed jaw 103.

The vises 97 and 98 are disposed in coplanar alignment. The key vise 90 is horizontally offset from the plane of the vises 97, 98 a distance equal to the horizontal offset of the planes of the periphery of the cutter 21 and the tip 35 of the stylus 34.

It will be noted, with particular reference to FIG. 1, that the vise assembly 22, in the course of the cutting operation, will pivot about the axis of shaft 38. In the course of such pivotal movement, the key blank B2 will move toward and away from the axis of the cutter shaft 24 along an arc 104. Similarly, the blank B1, held in vise 97, will move, responsive to the pivotal movement of the vise assembly, about the arc 105.

It will be noted that the lever arm or spacing of the blank engaging portions of the vise assembly 97 from the pivot point 38 is greater than the distance between the comparable portions of vise assembly 98. Accordingly, given a fixed degree of angular displacement of the vise assembly 22 about the shaft 38, the blank B1 will be bodily shifed through a greater distance than the blank B2.

Considering such different distances from the pivot point, one would normally anticipate that the depth of cut formed in the blank B1 might differ from the depth of the cut formed in the blank B2. However, to compensate and assure a precise identity of cut depths, the angular relationship of the blank B2 to arc 104 differs from the angular relationship of blank B1 to arc 105. Thus, by way of example, if the blank B2 moves upwardly ⅛ inches at a given point along the bitted length, the cutter will effect a cut the depth of which is essentially ⅛ inches. It will be noted, however, because of the tilted relationship of the vise 97 and blank B1, upward movement along the arc 105 of the blank B1 will produce a cut, the effective depth of which is essentially ⅛ inches although the blank B1 has moved through a greater physical distance than ⅛ inches. The angular relationship of the vises 97 and 98 is thus calculated to compensate for the differences in the actual physical distance moved by the vises by virtue of their differential displacement from the axis 38 of the vise assembly 22.

This arrangement has been found effective to enable cutting of two blanks at one time, the resulting replacement keys corresponding to the bitting of the pattern key with sufficient accuracy, within tolerance limits, to assure that the replacement keys will operate the locks for which they are intended.

The operation of the device will be evident from the preceding description.

The vise assembly 22 is loaded when the same is in its solid line position as depicted in FIG. 2. Loading is effected by clamping the pattern key K in vise 90 and the blanks to be cut, B1 and B2, in vises 97 and 98, respectively. With the members thus positioned and with the main power switch 68 in the "on" position, starter plunger 69 is tripped, energizing the motor 13.

The motor 13, acting through drive belt 16, rapidly rotates the cutter wheel 21 mounted on shaft 18. The speed reduction assembly chain including paired gears 25, 26 and 28, 29 operates slowly to rotate the cam 23 through a single revolution.

In the course of revolution of the cam 23 the vise assembly 22 is caused initially to move from the solid line to the dashed line positions shown in FIG. 2 by virtue of the spring assembly 52 which forces follower wheel 48 moving with the vise assembly against the cam surface 31. At the same time, the vise assembly 22 is yieldingly urged pivotally upward about shaft 38 by the plunger assembly 73, the roller portion 89 of which is biased against the base 12. The noted movements of the vise will cause the bitted surface of the key K to be scanned against the chisel tip 35 of the stylus 34. In the course of such movement, the periphery of the rotating cutting wheel 21 is being pressed against the blanks B1 and B2 and will cut the said blanks to the pattern defined by the coaction of the stylus tip 35 and the bitting of the key K.

It will be understood that the interaction of the key bitting and stylus provides a cam and follower arrangement whereby the pivotal movement of the vise assembly 22 varies in accordance with the depth of cuts in key K. If, by virtue of some extremely deep cuts being present in the key K, the blanks B1 and B2 are not fully cut in the inward stroke of the vise assembly, such cuts are completed in the course of the return stroke.

As previously described, adjustment of the spring force generated in the plunger assembly 73 is effective to vary the pressure with which the key is pressed against the stylus tip 35 and the blanks pressed against the periphery of the wheel. The importance of such adjustment is to permit compensation for a loss of sharpness of the milling wheel.

In certain prior art devices, the options available, where the wheel has lost its sharpness, are to replace the wheel or to run the key and key blank through a second cutting cycle. Obviously, the former procedure involves additional expense to the locksmith, and the latter a waste of time.

When the vise assembly 22 returns to its solid line position as shown in FIG. 2, the cam member 67 on the inner end of shaft 38 will engage against the follower 71, deactivating the micro switch and leaving the unit in a position at which, after removal of the key and the replacement keys formed from blanks B1, B2, the apparatus is ready for a new cutting cycle (solid line position, FIG. 4).

Many advantages flow from the utilization of a single cutting wheel to cut plural blanks. A principal such advantage lies in the fact that the differential wear factor inhering in the use of double cutting machines utilizing separate cutting wheels, as previously described, is completely overcome in the instant device. This is true regardless of whether or not the device has been used to cut one blank at a time.

Numerous modifications may occur to those skilled in the art who have been apprised of the instant teaching. Specifically, whereas the illustrated embodiment discloses a construction in which the cutter and stylus are fixed to the frame and relative movement between the key and key blanks is achieved by shifting the vise assembly, it is equally feasible to maintain the vise assembly at a stationary location relative to the frame and move the cutter and stylus as a unit.

Accordingly, this invention is to be broadly construed, with the claims being interpreted to encompass the noted reversal of parts.

Having thus described the invention and illustrated its use, what is claimed as new and is desired to be secured by Letters Patent is:

1. A key cutting device comprising, in combination, a frame having a base, motor means supported on said base, a rotary cutter and tracer assembly on said frame, said assembly including a cutting wheel rotating about a first axis, and a tracer member in predetermined spaced relation to the periphery of said wheel, a vise assembly mounted on said frame for compound movement relative to said cutter and tracer assembly in the direction of said axis and pivotally about a second axis parallel with said first axis, said vise assembly including key clamp means disposed adjacent said tracer for supporting a key with the bitted face thereof in engagement with said tracer, first and second key blank clamp means on said vise assembly in predetermined spaced relation to said key clamp means for holding first and second key blanks, respectively, adjacent the periphery of said rotary cutter, drive means for reciprocally moving said vise assembly relative to said cutter assembly in the direction of said first axis to cause the bitted surface of a key in said key clamp to be scanned forwardly and rearwardly along said tracer, cutter feed means yieldingly urging said key clamp means toward said tracer about said second pivot axis, said first and second blank clamp means being positioned to move key blanks supported therein toward and away from said first axis against spaced portions of the periphery of said cutter through distances corresponding to the distance said key clamp means moves toward and away from said tracer, thereby simultaneously to cut in said blanks, patterns corresponding to the bitted pattern of said key.

2. A device in accordance with claim 1 wherein said cutter feed means comprises a spring plunger assembly having a first end portion engaging said vise assembly and a second end portion slidably engaging said base for movement in the direction of said first axis, said plunger assembly yieldingly urging said vise assembly toward said cutter and tracer.

3. Apparatus in accordance with claim 2 and including adjustment means on said plunger assembly for varying the force with which said vise assembly is urged toward said cutter and tracer.

4. Apparatus in accordance with claim 3 wherein said second end portion of said plunger assembly includes a roller member engaging said base.

5. Apparatus in accordance with claim 1 wherein said first key blank clamp means is disposed closer to said second pivot axis than said second blank clamp means whereby said blank clamp means describe different arcuate paths responsive to movement of said vise assembly about said second pivot axis, said first and second clamp means being oriented substantially toward said first axis in all active positions thereof, the arcuate path described by said first clamp means lying closer to said first axis than the arcuate path described by said second clamp means.

6. Apparatus in accordance with claim 5 wherein said key clamp means is displaced a distance from said second pivot axis intermediate the distances which said first and second clamps are displaced from said axis.

7. A key cutter comprising a cutter wheel, a stylus member supported in predetermined spaced relation to the periphery of said wheel, a vise assembly including key clamp means, and first and second key blank clamp means, the spacing of said first and second clamp means from said key clamp means corresponding to the spacing of said stylus member from first and second portions on the periphery of said cutter wheel, and feed means for relatively moving said vise assembly and said stylus and cutter to scan a key held in said key clamp means across said stylus and simultaneously and concomitantly move a pair of key blanks held in said first and second blank clamp means respectively against said first and second spaced portions of said wheel, thereby to duplicate in said blanks the pattern of said key.

8. A key cutter in accordance with claim 7 wherein said relative movement includes a pivotal movement about an axis parallel with the axis of said cutter, said first and second blank clamps are disposed in differentially spaced relation to said pivot axis, whereby the length of the arcs described by said first and second clamps are different, said first and second clamps being oriented in different angular relations with respect to said arcs, whereby the effective depth of cut formed on key blanks disposed within said clamps is substantially equal, notwithstanding the actual distance moved by said blanks in the course of formation of said cuts varies.

* * * * *